United States Patent
Cragun et al.

(10) Patent No.: US 8,166,414 B2
(45) Date of Patent: *Apr. 24, 2012

(54) TAB ORDER MAPPING OF USER INTERFACES

(75) Inventors: Brian J. Cragun, Rochester, MN (US); Barnaby L. Court, Morrisville, NC (US); Andrew L. Hanson, Rochester, MN (US); Roland A. Merrick, Harvington Nr. Evesham (GB); Timothy J. O'Keefe, Rochester, MN (US); Elizabeth A. Schreiber, Cary, NC (US); David B. Styles, Cary, NC (US); Brian O. Wood, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 988 days.

This patent is subject to a terminal disclaimer.

(21) Appl. No.: 12/109,425

(22) Filed: Apr. 25, 2008

(65) Prior Publication Data

US 2008/0201646 A1 Aug. 21, 2008

Related U.S. Application Data

(63) Continuation of application No. 10/770,284, filed on Feb. 2, 2004, now Pat. No. 7,516,414.

(51) Int. Cl.
*G06K 15/00* (2006.01)
(52) U.S. Cl. .................................. 715/777; 715/864
(58) Field of Classification Search .............. 715/777, 715/864, 855, 854, 865, 804, 745, 747, 776, 715/802, 846
See application file for complete search history.

(56) References Cited

U.S. PATENT DOCUMENTS

| | | | |
|---|---|---|---|
| 5,721,852 A | 2/1998 | Porter | 715/777 |
| 5,790,118 A | 8/1998 | Bertram | 345/339 |
| 5,801,691 A | 9/1998 | Dahl | 345/339 |
| 5,809,250 A | 9/1998 | Kisor | 709/227 |
| 6,310,634 B1 | 10/2001 | Bodnar et al. | 715/854 |
| 6,330,007 B1 | 12/2001 | Isreal et al. | 715/762 |
| 6,330,717 B1 | 12/2001 | Raverdy et al. | 717/170 |
| 6,419,496 B1 | 7/2002 | Vaughan, Jr. | 434/322 |
| 6,437,810 B1 | 8/2002 | Nakajima et al. | 715/804 |
| 6,501,469 B1 | 12/2002 | MacPhail | 345/419 |
| 6,507,343 B1 | 1/2003 | MacPhail | 345/440 |
| 6,523,040 B1 | 2/2003 | Lo et al. | |

(Continued)

OTHER PUBLICATIONS

Wu et al., "Dynamic Refinement of Table Summarization for M-Commerce," IEEE Int'l Workshop on Advanced Issues of E-Commerce and Web-Based Information Systems, 2002, (8 pgs).

*Primary Examiner* — Steven Sax
(74) *Attorney, Agent, or Firm* — VanLeeuwen & VanLeeuwen

(57) ABSTRACT

An approach is provided to display a common display page on a variety of display devices using the item's tab order property to determine the display order. Controls that are displayed on a display device typically have a tab order. When a window that has controls is displayed, the cursor is typically placed at the control with the lowest (i.e., first) tab order. When the user presses the tab key, the cursor moves to the control corresponding to the next lowest tab order. This allows the designer to design a single window (or panel) that is displayed differently on constrained devices. However, even though the window is displayed differently, using tab order mapping maintains a consistent visible proximity between controls despite the type of display device being used by the user.

9 Claims, 16 Drawing Sheets

U.S. PATENT DOCUMENTS

| | | | |
|---|---|---|---|
| 6,533,822 B2 | 3/2003 | Kupiec | 715/531 |
| 6,677,964 B1 | 1/2004 | Nason et al. | 715/764 |
| 6,718,218 B1 | 4/2004 | Matheson | 700/95 |
| 6,816,174 B2 | 11/2004 | Tiongson et al. | 715/787 |
| 6,876,368 B2 | 4/2005 | Dove et al. | 715/762 |
| 6,980,200 B2 | 12/2005 | Goren | 345/169 |
| 7,069,506 B2 | 6/2006 | Rosenholtz et al. | 715/526 |
| 7,117,504 B2 | 10/2006 | Smith et al. | 719/328 |
| 7,120,916 B1 | 10/2006 | Firth et al. | 719/328 |
| 7,149,983 B1 | 12/2006 | Robertson et al. | 715/810 |
| 7,246,370 B2 | 7/2007 | Valente et al. | 726/1 |
| 7,249,325 B1 | 7/2007 | Donaldson | 715/777 |
| 7,516,414 B2 * | 4/2009 | Cragun et al. | 715/777 |
| 2002/0103881 A1 | 8/2002 | Granade et al. | 709/218 |
| 2002/0129126 A1 | 9/2002 | Chu et al. | 709/220 |
| 2002/0149614 A1 | 10/2002 | Biebesheimer et al. | 345/738 |
| 2002/0188434 A1 | 12/2002 | Shulman et al. | 703/21 |
| 2002/0198876 A1 | 12/2002 | Zielinski et al. | 707/4 |
| 2003/0063120 A1 | 4/2003 | Wong et al. | 345/746 |
| 2003/0067485 A1 | 4/2003 | Wong et al. | 345/747 |
| 2003/0067489 A1 | 4/2003 | Wong et al. | 345/765 |
| 2003/0070061 A1 | 4/2003 | Wong et al. | 712/220 |
| 2003/0078991 A1 | 4/2003 | Harris | 709/218 |
| 2003/0231205 A1 | 12/2003 | Shima et al. | 345/744 |
| 2004/0068429 A1 | 4/2004 | MacDonald | 705/10 |
| 2004/0100509 A1 | 5/2004 | Sommerer et al. | 345/864 |
| 2004/0100510 A1 | 5/2004 | Milic-Frayling et al. | 345/864 |
| 2004/0111673 A1 | 6/2004 | Bowman et al. | 715/513 |
| 2004/0128353 A1 | 7/2004 | Goodman et al. | 709/204 |
| 2004/0139100 A1 | 7/2004 | Gottsman | 707/102 |
| 2004/0139396 A1 | 7/2004 | Gelernter et al. | 715/515 |
| 2004/0261035 A1 | 12/2004 | Emerson et al. | 715/777 |
| 2005/0015730 A1 | 1/2005 | Gunturi et al. | 715/777 |
| 2005/0044504 A1 | 2/2005 | Fernandez et al. | 715/762 |
| 2005/0154691 A1 | 7/2005 | Higgins et al. | 706/46 |
| 2006/0085749 A1 | 4/2006 | Daniel et al. | 715/703 |
| 2006/0282787 A1 | 12/2006 | Smith et al. | 715/762 |

* cited by examiner

TAB ORDER MAPPING OF USER INTERFACES

RELATED APPLICATIONS

This application is a continuation application U.S. Non-Provisional patent application Ser. No. 10/770,284, entitled "System and Method for Tab Order Mapping of User Interfaces," filed on Feb. 2, 2004 now U.S. Pat. No. 7,516,414.

BACKGROUND OF THE INVENTION

1. Technical Field

The present invention relates in general to a system and method for mapping user interfaces. In particular, the present invention relates to a system and method for using the tab order of elements to determine the order in which elements are displayed on a constrained device.

2. Description of the Related Art

A common problem in the computer industry is running applications on devices having different form factors and different display sizes. A user may wish, for example, to run Microsoft Word both on this personal computer system at home and on his personal data assistant (PDA) while on the road. The same application user interface, however, will not work on both displays. The Pocket PC display cannot display the same amount of information that an application like Word typically displays on the larger screen of a personal computer. An application's user interface would have to be significantly adapted in order to execute the application on a PDA. Mobile phone displays are more constrained than PDA displays. An application's user interface would need to be modified yet again for an application to execute on a mobile phone.

Often, an application designer is required to design a different user interface for each one of the different display types an application is to execute on. In having to do so, much of the application designer's effort is duplicated. Most of the visual layout of the application's user interface has to be redesigned by specifying a different position for each of the different elements/controls used in the interface.

Currently, most applications use separate style sheets to achieve renderings of the user interface on different types of devices. While this alleviates some of the duplicate effort, it requires the application developer to develop multiple style sheets to achieve appropriate rendering of the user interface across a variety of devices. These devices are not generally platform or container independent.

What is needed therefore is a system and a method that would enable the application designer to more easily design an application that can be used on multiple platforms without much duplicated effort for each additional display/device. In addition, the application designer should be able to specify rules on how the user interface for an application would be rendered (depending on the width, height, and other display capabilities, for example) on devices having different display types.

In particular, what is needed is a system and method that renders elements on a constrained display in an order determined by the tab order of the various displayed elements.

SUMMARY

It has been discovered that a common display page can be displayed on a variety of display devices by using the item's tab order property to determine the display order. Controls that are displayed on a display device typically have a tab order. As used herein, "tab order" refers to any property that indicates an sequencing of field traversal. When a window that has controls is displayed, the cursor is typically placed at the control with the lowest (i.e., first) tab order. As used herein, "cursor" refers to any method of indicating the active entry field, such as highlighting and enabling. When the user presses the tab key, the cursor moves to the control corresponding to the next lowest tab order. This allows the designer to design a single window (or panel) that is displayed differently on constrained devices. However, even though the window is displayed differently, using tab order mapping maintains a consistent visible proximity between controls despite the type of display device being used by the user.

While the tab key is the common control used by software to allow the user to navigate between fields, other keys are anticipated as navigation controls (such as the enter key, arrow keys, cursor key, and function keys) as well as input from the pointing devices (including mouse clicks, mouse chords, and mouse gestures), and other input devices in use and that will be developed. As used herein, "tab order" refers to any indicator of defining an ordered sequence of traversal, visitation, focus, or cursor movement; including lists, links, pointers, sorting criteria, and the like.

When the window is displayed on a constrained display device, the width of the constrained display device is often not wide enough to accommodate the window as it was designed. In these constrained environments, the controls are displayed in their corresponding tab order. The display area is divided into rows. The first tab ordered control is displayed on the first row. If there is room for the second tab ordered control to be displayed on the first row, it is displayed after (i.e., to the right of) the first control, if there is not enough room, the second control is displayed on the second row. Rows continue to be filled based upon the tab order of the controls. In this manner, several small controls with sequential tab orders can be placed on a single row and controls will be displayed on the next row when the previous row is filled.

The user experience using the window on different display types is consistent as the user can tab from one control to the next and controls with adjacent tab orders are displayed in a location proximate to one another regardless of the display size. In addition, wrapping from one row to the next limits or eliminates the amount of horizontal scrolling the user needs to perform to move from one control to the next. While the examples and descriptions set forth above are for row-based environments, it will be appreciated by those skilled in the art, after reviewing the details set forth herein, that a column based approach will work equally well using these principles with display columns being filled (instead of rows) and the user's tab control moving the cursor first from the top to the bottom of the display before moving to the next column. In addition, while a left-to-right orientation is described, it will be appreciated by those skilled in the art that a right-to-left orientation will also work. Different orientations may be preferred when using a language that does not operate in a left-to-right, top-to-bottom fashion.

It should be understood that enablement based on tab order is only one method of setting and determining traversal order of fields in an application. As used herein, and with particular in reference to the claims, the term tab order refers any indicator or control of field or focus traversal, visitation, sequencing, cursor motion. It should be understood that the tab key is only one possible initiator of a change in field traversal, and that other keys, such as enter, cursor keys, end keys, etc, and other input devices, such a pointing devices, such as mice, and methods of using such devices, such as mouse clicks, chording, and gestures, can also be used as initiators of field traversal. As used herein, tab key refers to any user control which causes field traversal to change, such as enter, cursor keys, end keys, etc, and other input devices, such a pointing devices, such as mice, and methods of using such devices, such as mouse clicks, chording, and gestures, etc.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
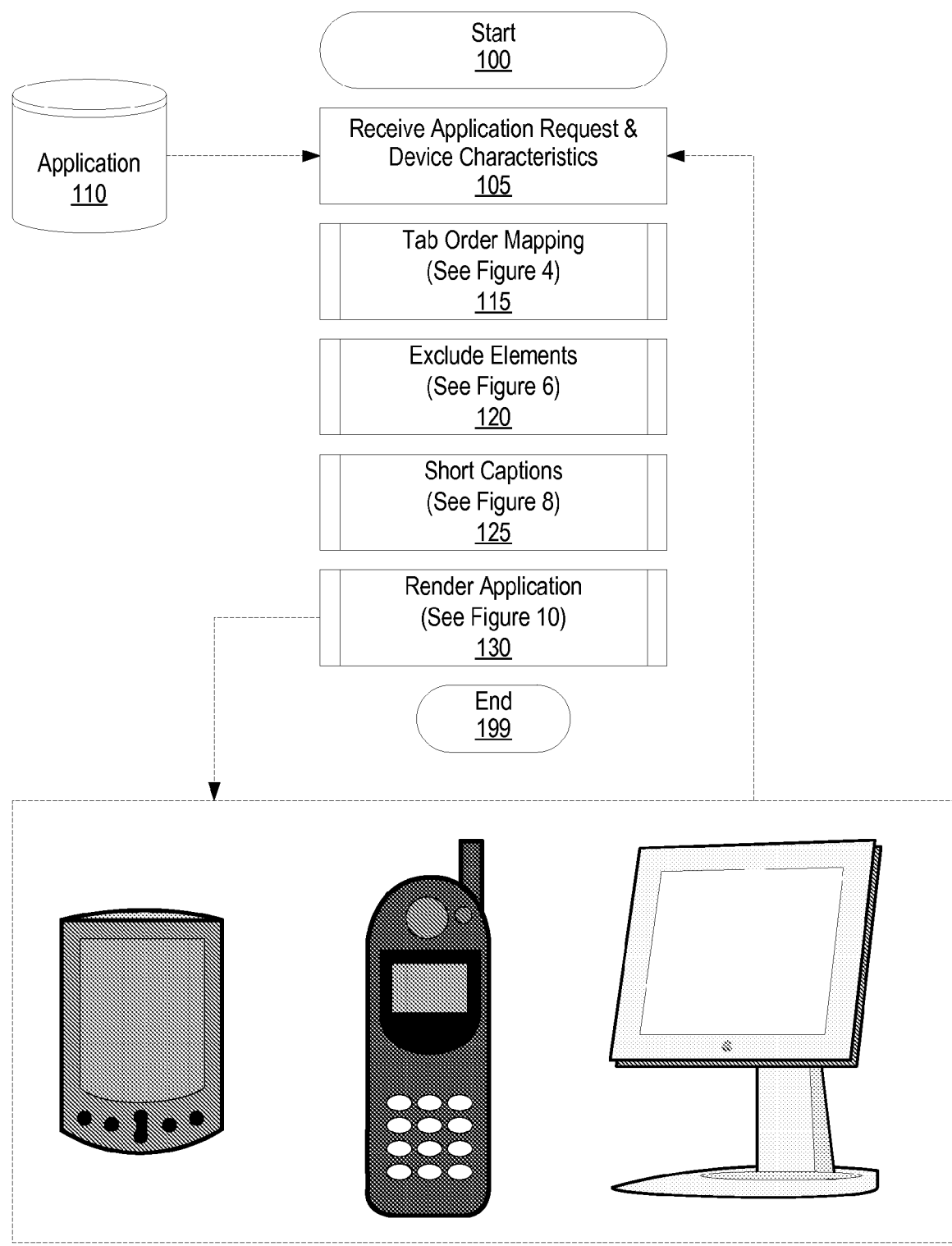
FIG. 1 is a flowchart illustrating a method for rendering an application on devices of different form factors and display capabilities.

FIG. 1 is a flowchart illustrating a method for rendering an application on devices of different form factors and display capabilities. Processing begins at 100 whereupon, at step 105, a request is received to execute and render application 110, for example. In addition to receiving the code necessary to execute application 110, information on how to render the application's user interface window on displays of different devices is also received. In one embodiment, the rendering information is provided by the application designer during the design of the user interface. In addition, the rendering information may customized by the user of the device in order for the user interface layout to fit the user's preferences. For example, information may be received on the "tab ordering" of the user interface controls, information may be received on which elements to exclude from the display of which devices, information may be received on the devices requiring short captions in place of regular captions for labeling elements, etc.

At step 105, information is also received on the type of device on which the application is to be executed. For example, the application may be rendered on the large display of a personal computer, on the medium-sized and somewhat constrained display of a personal data assistant (PDA), or the application may be rendered on a small and highly constrained display of a mobile phone. Using the information provided by the application designer during the designing of the application and the modifications a user may make to the user interface, the application will be shown differently on displays of different size.

At predefined process 115, the "tab order" of the user interface controls is determined. The tab order is the order in which the user interface controls are navigated when the user presses the "tab" key on the keyboard or when the user executes a tab-equivalent action. More details on the processing that takes place during predefined process 115 are provided in the flowchart of FIG. 4.

At predefined process 120, the elements to be excluded from rendering on a specific display are determined. The application designer or user may specify which elements are not displayed on devices having constrained displays, such as the display of a mobile phone. For example, the designer or user may exclude the rendering of lesser important elements on smaller displays. More details on the processing that takes place during predefined process 120 are provided in the flowchart of FIG. 6.

At predefined process 125, the elements requiring short captions on the particular device are identified. Short caption information may be provided by the application designer or by the user in order to accommodate the rendering of the application on smaller, constrained displays. More details on the processing that takes place during predefined process 125 are provided in the flowchart of FIG. 8.

At predefined process 130, the application is rendered on the selected device using the information determined in the previous steps. More details on the processing that takes place during predefined process 130 are provided in the flowchart of FIG. 10.

Figure 2:
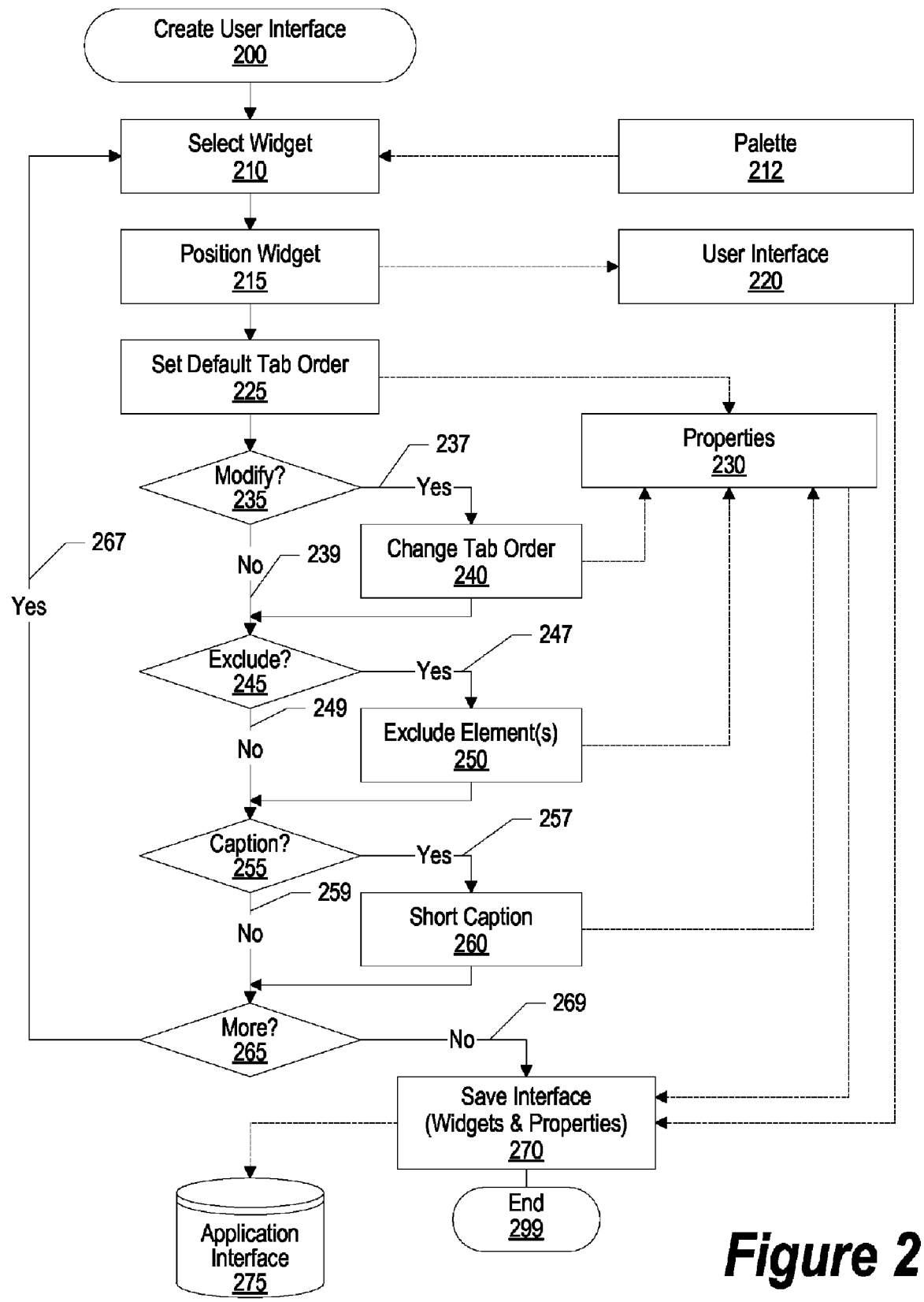
FIG. 2 is a flowchart illustrating a method for creating an application's user interface for rendering on devices of different form factors and display capabilities.

FIG. 2 is a flowchart illustrating a method for creating an application's user interface for rendering on devices of different form factors and display capabilities. Processing begins at 200 whereupon, at step 210, a widget is selected from palette 215. The widget may be, for example, a table, a tree, or an input field to be used as part of the user interface. At step 215, the selected widget is dragged by the application designer and positioned on the user interface design canvas 220 to begin designing the application.

At step 225, the default "tab order" for the selected widget is set (i.e., the next tab order following the last tab order currently shown on user interface 220). The tab order is the order in which the user interface controls are navigated when a user presses the "tab" key on the keyboard or when the user executes another tab-equivalent action. The tab order defines the logical flow of data input for the application. The selected tab order is stored in properties storage 230. The information stored in properties storage 230 is provided to a device to be used in the proper rendering of the application by the device.

A determination is then made as to whether the tab order for the selected widget is to be modified at decision 235. If the tab order of the widget is to be changed, decision 235 branches to "yes" branch 237 whereupon, at step 240, the tab order for the widget is changed and the new tab order is updated in properties storage 230. On the other hand, if the tab order does not need to be modified, decision 235 branches to "no" branch 239 bypassing step 240. Processing then continues at decision 245.

A determination is made as to whether the widget (element) is to be excluded from rendering on certain devices. If the widget is to be excluded from rendering on certain devices, decision 245 branches to "yes" branch 247 whereupon, at step 250, a selection is made as to from which devices/displays the widget/element is to be excluded. For example, the widget may be excluded from rendering on the display of a specific device such as PDA or a mobile phone but not from the display of a personal computer system. The exclusion information is then saved in properties storage 230. In another embodiment, an element may be excluded from a class or group of devices as opposed to the element being excluded from specific devices. For example, the element may be excluded from rendering on mobile phone-type displays. If the widget is not to be excluded from rendering on any devices, decision 245 branches to "no" branch 249 bypassing step 250. Processing then continues at decision 255.

At decision 255, a determination is made as to whether a short caption will be used to label the widget. A short caption may be used as an alternative to a longer caption on devices having constrained displays. If a short caption is to be used to label the widget, decision 255 branches to "yes" branch 257 whereupon, at step 260, the short caption option is selected for the widget, and a short caption is entered. The short caption information is saved in properties storage 230. If a short caption is not to be used, decision 255 branches to "no" branch 259 bypassing step 260. Processing continues at decision 265.

A determination is made at decision 265 as to whether the application designer wants to place more widgets on the user interface design canvas. If there are more widgets to be placed on the design canvas, decision 265 branches to "yes" branch 267 where processing loops back to step 210 for the next widget to be placed on the canvas and its properties to be set by the designer.

This looping continues until there no more widgets to be added to the canvas, whereupon decision 265 branches to "no" branch 269 whereupon, at step 270, the designed user interface along with the rendering properties 230 for rendering the interface are saved in application interface storage 275. Processing subsequently ends at 299.

Figure 3:
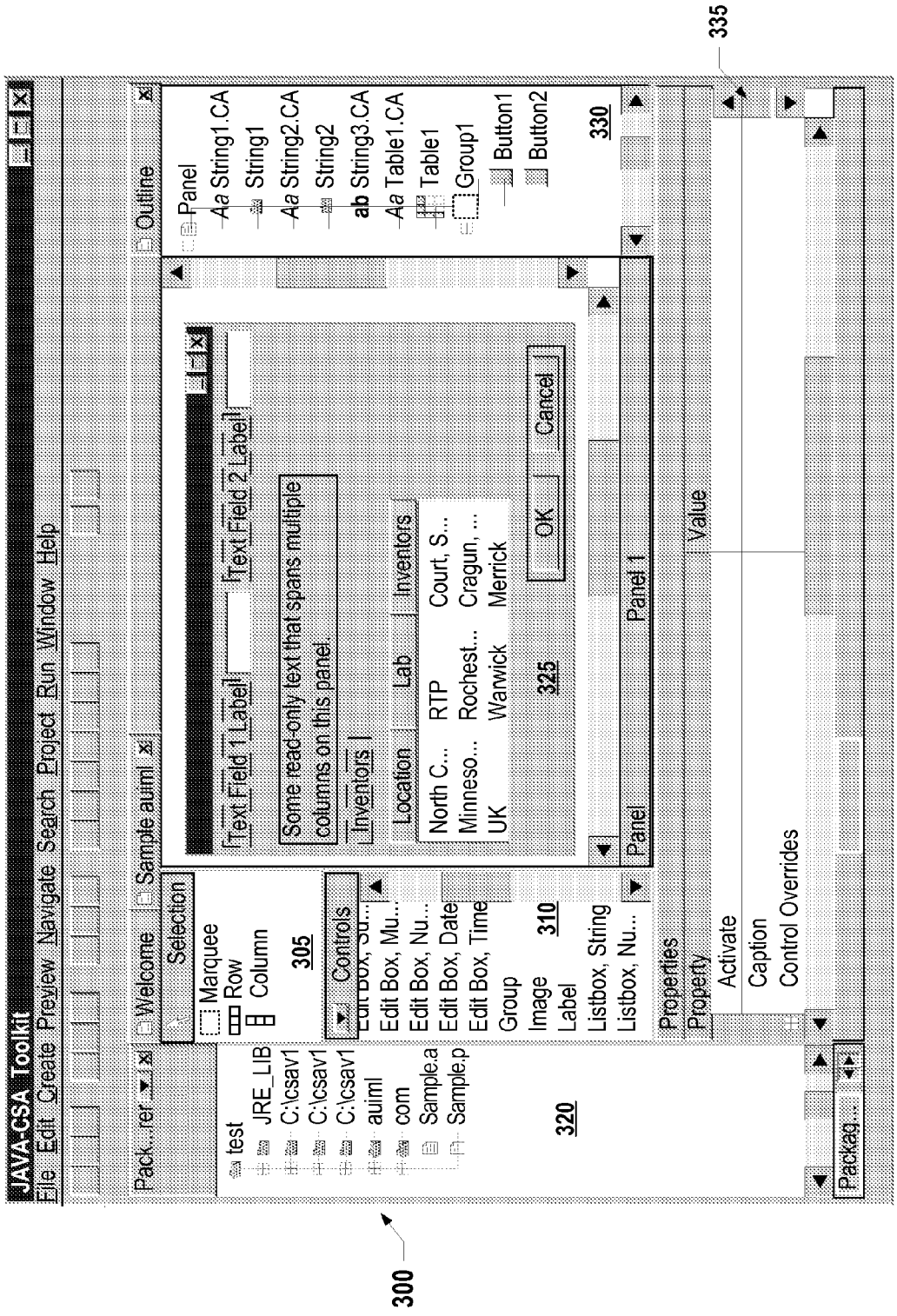
FIG. 3 is an application window illustrating the builder application used in creating an application's user interface.

FIG. 3 is an application window illustrating the builder application used in visually creating an application's user interface. Window 300 shows an example how the builder application toolkit window may appear while designing the application's user interface. The toolkit contains a set of menus from which the application designer can select and perform certain actions related to the user interface design.

Window 320 shows a list of the different projects an application designer may be working on. The application designer may switch between the different projects by selecting a project from the tree structure shown in window 320.

Window 305 shows different ways an application designer may choose to select objects on the user interface design canvas. For example, the application designer may choose to select elements by row, column, etc.

Window 325 is the design canvas showing a preview of the user interface design in progress. The application designer can use this preview window to see how the application may be rendered on a given device, including the tab order of the elements, which elements are to be excluded, which elements will be using short captions, etc. The application designer may specify to which device/display the preview window corresponds.

Window 310 shows a list of the controls an application designer may choose to place on the design canvas. The controls or elements may include edit boxes, images, labels, listboxes, groups for grouping sets of controls, etc. Window 330 shows a list of the elements that the application designer has already placed on the user interface design canvas. The window also indicates the grouping, if any, of the elements. For example, button1 and button2 are shown to both belong to group1.

Window 335 shows a list of the properties associated with a selected element that the application designer has placed on the user interface design canvas. Using the element's properties, the application designer may designate a caption for the selected element, control overrides for the element, etc.

Figure 4:
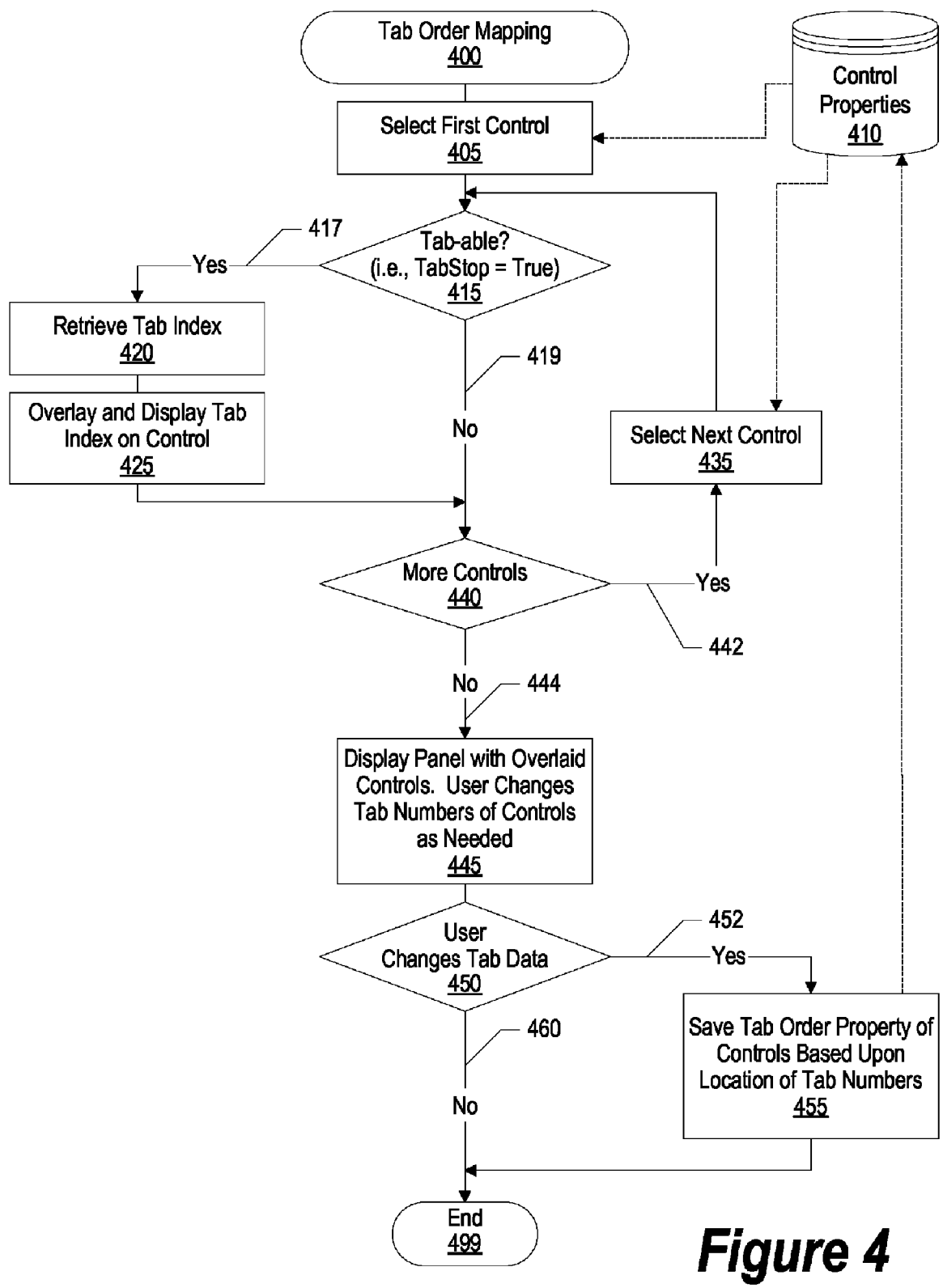
FIG. 4 is a flowchart illustrating a method for determining the "tab order" of the user interface controls.

FIG. 4 is a flowchart illustrating a method for determining the "tab order" of the user interface controls. In one embodiment, a separate window may be generated to show the application designer or the user the tab order of the different controls and to allow the user or the application designer to change the controls' tab order. The tab order defines the logical flow of data input for the application. Processing begins at 400 whereupon, at step 405, the first control is selected and the control's properties are retrieved from control properties 410.

A determination is then made as to whether the control is tab-able (decision 415). In one embodiment, whether a control is tab-able can be determined by inspecting the control's TabStop property. If the control is tab-able, decision 415 branches to "yes" branch 417 whereupon, at step 420, the tab-order index for the control is retrieved. The tab index indicates the tab order chosen by the application designer for that control. At step 425, the tab order index is overlaid and displayed on the control. On the other hand, if the control is not tab-able, decision 415 branches to "no" branch 419 bypassing steps 420 and 425. Processing subsequently continues at decision 440.

A determination is made as to whether more controls remain for which the tab order is to be determined at decision 440. If more controls remain, decision 440 branches to "yes" branch 442 whereupon, at step 435, the next control is selected from control properties data store 410 and processing loops back to process the newly selected control. This looping continues until there are no more controls remain to be processed, at which time decision 440 branches to "no" branch 444. At step 445, the user interface window is displayed with the tab order index overlaid on the controls. At this point the application designer or the user may change the tab order given to the controls by the application designer. In one embodiment, the application designer or user changes the tab order by selecting the overlaid tab number corresponding to the control and either changing the number using the keyboard or dragging the number to a different control, whereupon the tab order numbers for the two controls are swapped.

A determination is then made as to whether the application designer or the user has selected to change the tab order for one or more of the controls at decision 450. If the user wishes to change the tab order, decision 450 branches to "yes" branch 452 whereupon, at step 455, the changed tab order is saved in control properties data store 410. On the other hand, if the application designer or the user does not change the tab order data, decision 450 branches to "no" branch 460 bypassing step 455. Processing thereafter ends at 499.

Figure 5:
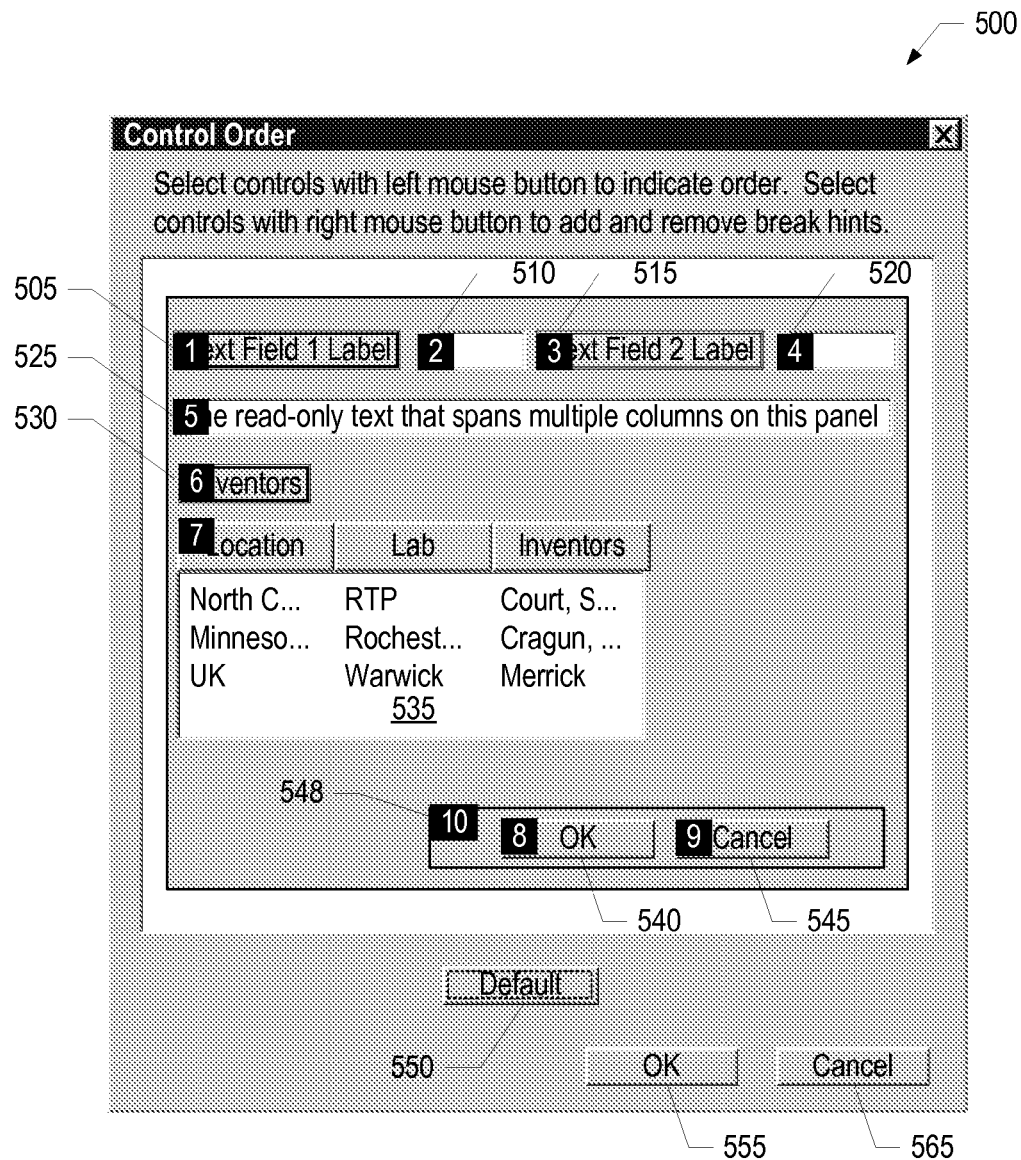
FIG. 5 is an application window illustrating a Control Order Editor window that displays a preview of the tab order of various controls to allow the application designer to change the tab order.

FIG. 5 is an application window illustrating the Control Order Editor window that displays a preview of the tab order of various controls to allow the application designer or the user to change the tab order. As shown, the current tab order of the controls layout on user interface window 500 is: (1) text field 505, (2) input field 510, (3) text field 515, (4) input field 520, (5) multiple-column field 525, (6) label 530, (7) table 535, (8) "OK" button 540, (9) "cancel" button 545, and (10) group 548. The application designer or user can accept the current order by clicking "OK" button 555 or exit the Control Order Editor without saving any changes by clicking "Cancel" button 565.

The application designer or user may select a control in order to change the tab order of the control by clicking on the control using the left mouse button, or the user may select a control using the right mouse button to alter tab properties. In addition, the user can select one of the tab controls and drag it to a different tab control, whereupon the tab order numbers of the two controls are swapped. After making changes, the application designer may click on "OK" button 555 or the application designer may click on "Default" button 550 to return the tab order of the controls to the original tab order.

Figure 6:
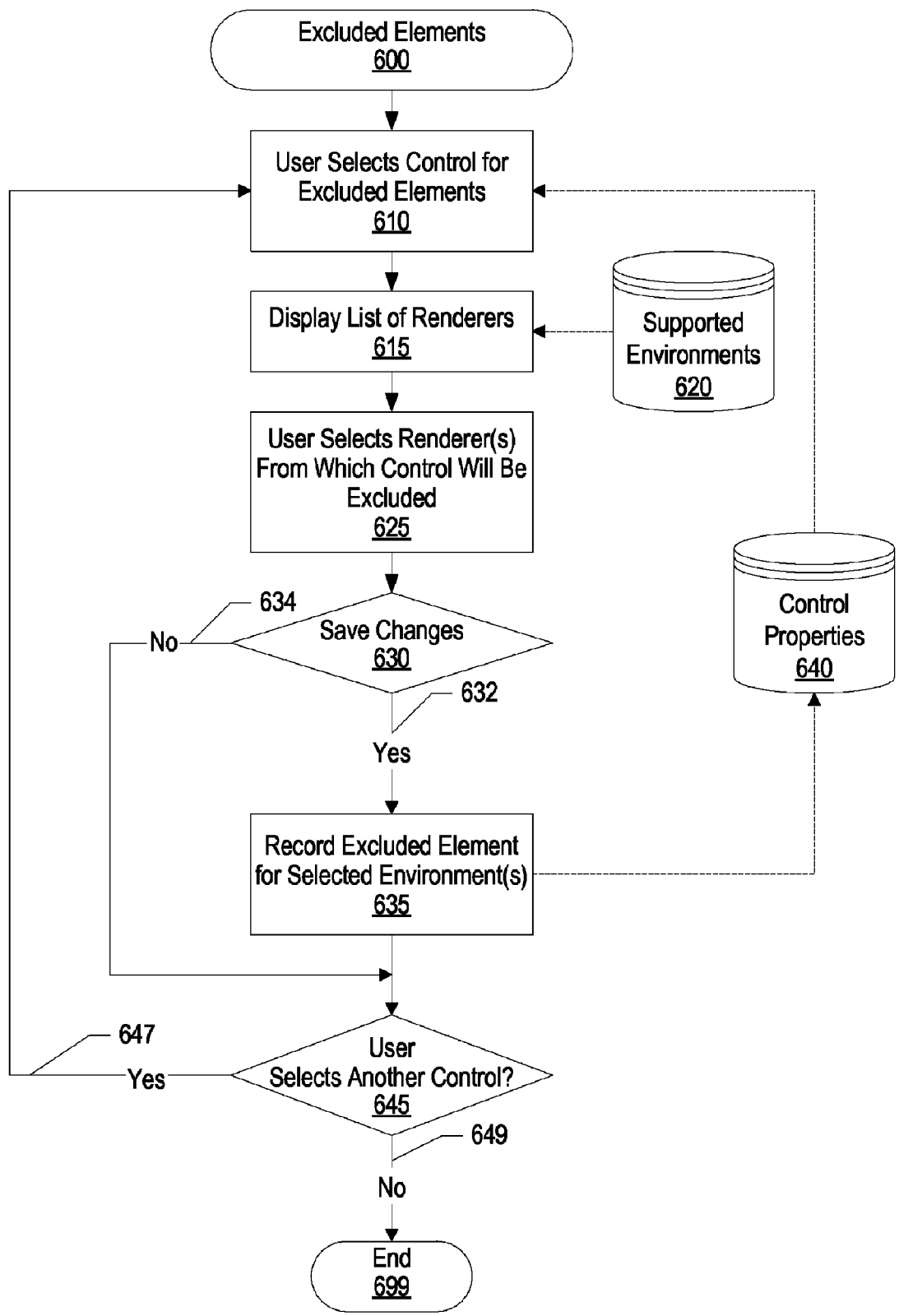
FIG. 6 is a flowchart illustrating a method for designating elements to be excluded from rendering on certain devices.

FIG. 6 is a flowchart illustrating a method for designating elements to be excluded from rendering on certain devices. Processing begins at 600 whereupon, at step 610, the user selects the control to be added to the excluded elements list.

At step 615, the user requests the display of a list of available renderers. The list is obtained from supported environments data store 620. The list may include, for example, a personal computer environment, a PDA environment, a pocket PC environment, and a mobile phone environment. In another embodiment, the received list may include classes or group of devices as opposed to specific devices or specific environments. At step 625, the application designer or user selects the renderer(s) or classes of renderers from which the selected control is to be excluded.

A determination is then made as to whether the changes made by the user are to be saved (decision 630). If the changes are to be saved, decision 630 branches to "yes" branch 632 whereupon, at step 635, the selected environments from which the element is to be excluded are recorded in control properties data store 640. On the other hand, if the user elects not to save the changes, decision 630 branches to "no" branch 634 bypassing step 635.

A determination is made as to whether the user wants to select another control to be excluded from one or more environments (decision 645). If another control is to be excluded, decision 645 branches to "yes" branch 647 whereupon processing loops back to step 610 for the next control to be excluded. Processing continues to loop back until no more controls are selected, at which point decision 645 branches to "no" branch 649 whereupon processing ends at 699.

Figure 7A:
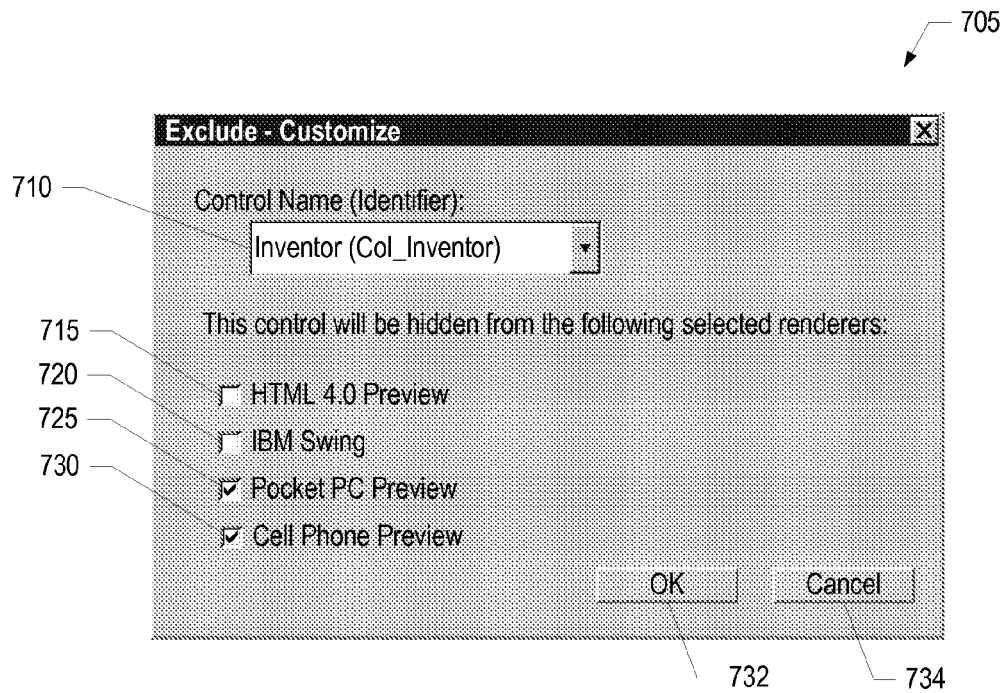
FIG. 7A is an application window illustrating a method for selecting from which devices to exclude the rendering of the "Inventor (Col_Inventor)" user interface control.

FIG. 7A is an application window illustrating a method for selecting devices from which to exclude the rendering of a control. In the example shown, the "Inventor (Col_Inventor)" user interface control is being excluded from Pocket PC environments and from Cell Phone environments. As shown, window 705 includes selection box 710 that contains the names of all the controls available on the user interface. A user selects the control to be excluded in selection box 710 and also selects the renderers from which the control is to be excluded by checking one of the checkboxes (checkboxes 715-730). If the user selects checkbox 715, the control is to be excluded from HTML 4.0 preview; if the user selects checkbox 720, the control is to be excluded from IBM Swing; if the user selects checkbox 725, the control is to be excluded from Pocket PC Preview; and if the user selects checkbox 730, the control is to be excluded from Cell Phone Preview. As part of the Java Foundation Classes (JFC), the IBM Swing component set builds on the Abstract Window Toolkit (AWT) to provide a pure Java-based graphical user interface (GUI) for programs. The user can check any number of checkboxes.

In another embodiment, the user or application designer may be given choices of classes of displays/devices from which an element or elements are to be excluded as opposed to specific devices. For example, the choices may be: personal computer-type displays, PDA-type displays, and mobile phone-type displays.

The user may then click on "OK" button 732 to accept and save the changes made, or the user may click on "Cancel" button 734 to reject the changes made.

Figure 7B:
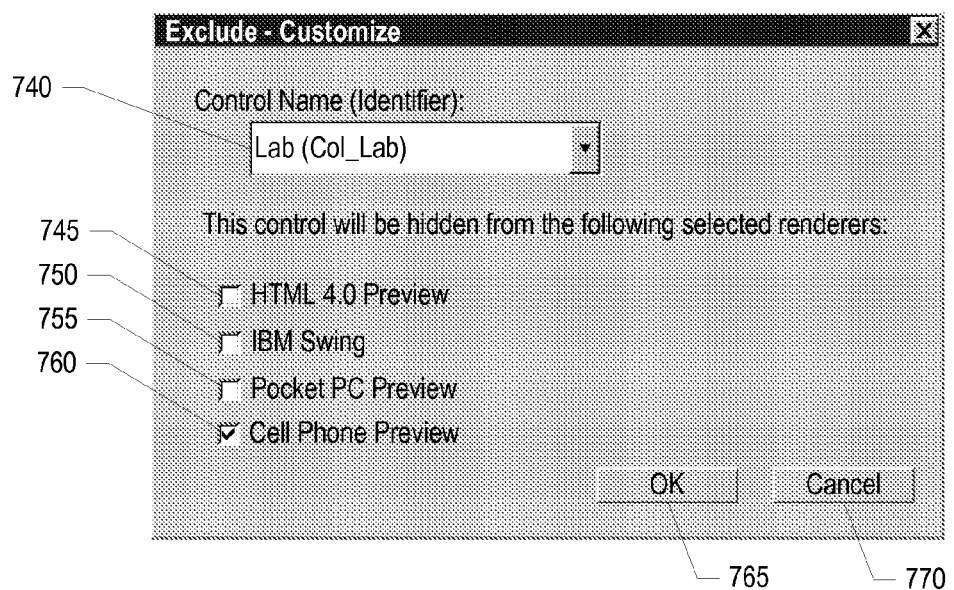
FIG. 7B is an application window illustrating a method for selecting from which devices to exclude the rendering of the "Lab (Col_Lab)" user interface control.

FIG. 7B is an application window illustrating a method for selecting devices from which to exclude the rendering of a control. In the example shown, the "Lab (Col_Lab)" user interface control is being excluded from Cell Phone environments. As shown, window 735 includes selection box 710 that contains the names of all the controls available on the user interface. A user may first select the control to be excluded in selection box 740 and proceed to select the renderers from which the control is to be excluded. If the user selects checkbox 745, the control is to be excluded from HTML 4.0 preview; if the user selects checkbox 750, the control is to be excluded from IBM Swing; if the user selects checkbox 755, the control is to be excluded from Pocket PC Preview; and if the user selects checkbox 760, the control is to be excluded from Cell Phone Preview.

In another embodiment, the user or application designer may be given choices of classes of displays/devices from which an element or elements are to be excluded as opposed to specific devices. For example, the choices may be: personal computer-type displays, PDA-type displays, and mobile phone-type displays.

The user may then click on "OK" button 765 to accept and save the changes made, or the user may click on "Cancel" button 770 to reject the changes made. Using the selections made in the examples shown in FIGS. 7A and 7B, when a Cell Phone environment is used, the inventor column and the lab column will be excluded. When a Pocket PC environment is used, only the inventor column will be excluded, and neither column will be excluded when using the HTML environment or the IBM Swing environment.

Figure 8:
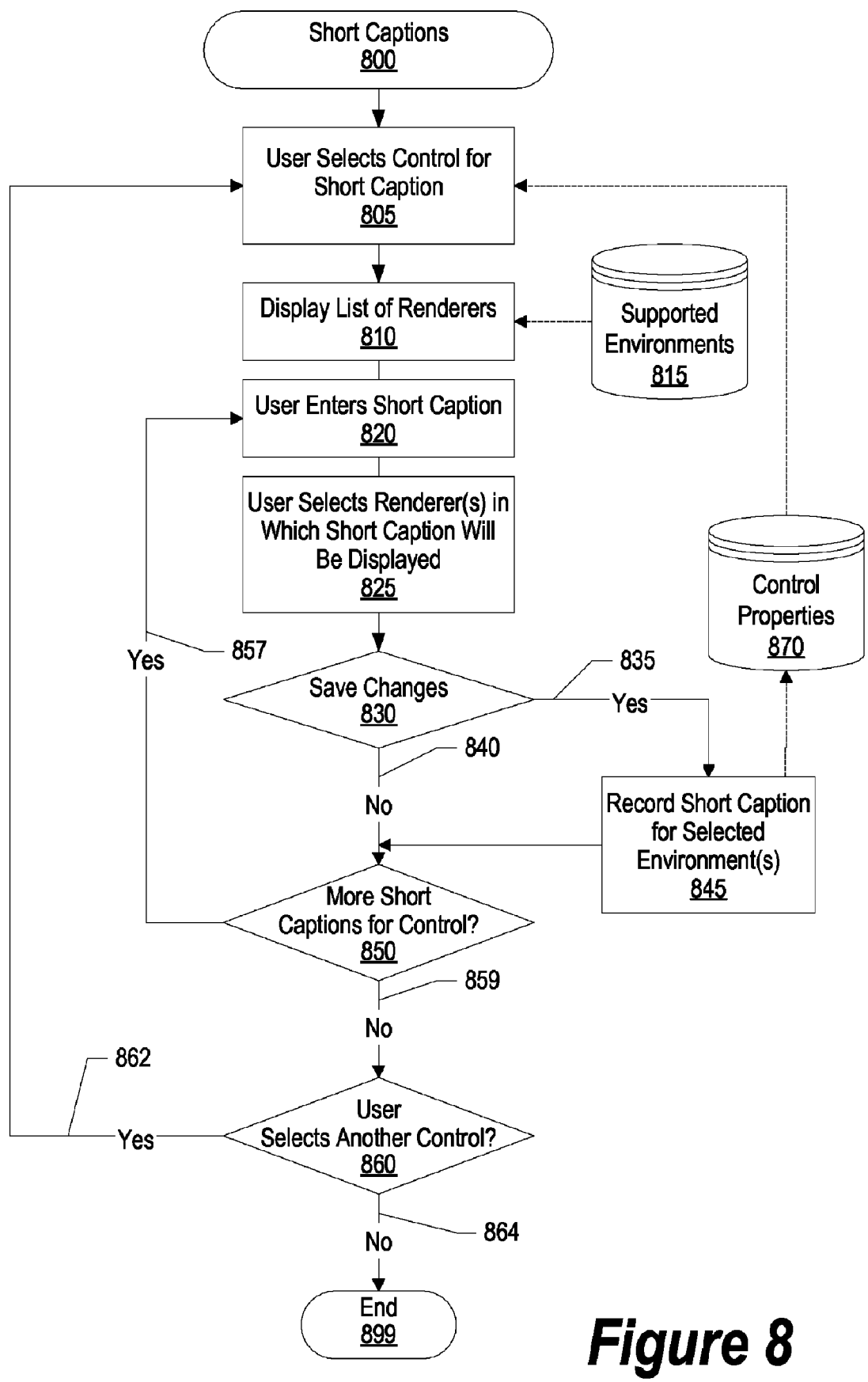
FIG. 8 is flowchart illustrating a method for designating alternative short captions for labeling user interface controls.

FIG. 8 is flowchart illustrating a method for designating alternative short captions for labeling user interface controls.

Processing begins at 800 whereupon, at step 805, the user selects, from control properties 870, the control for which a short caption is to be entered. At step 810, a list of available renderers is received from supported environments storage 815. The list may include, for example, a personal computer, a PDA, and a mobile phone. At step 820, the user enters the short caption to be used with the selected control, and at step 825, the user selects the renderers in which the short caption is to be displayed. The user may select one or more of the renderers in order to display the short caption in each of the renderers. In another embodiment, the user may designate a different short caption for each of the different types of renderers.

A determination is then made as to whether to save the changes made to the short caption(s) at decision 830. If the changes are to be saved, decision 830 branches to "yes" branch 835 whereupon the short caption for the selected environment(s) is saved at step 845 in control properties data store 870. On the other hand, if the changes are not to be saved, decision 830 branches to "no" branch 840 bypassing step 845. A determination is made as to whether more short captions are to be entered for other controls (decision 850). If more captions are to be entered, decision 835 branches to "yes" branch 857 whereupon processing loops back to step 820 for the next short caption to be entered. This looping continues until no more short captions are entered for the control, at which point decision 850 branches to "no" branch 859.

A determination is made as to whether the user or application designer selects another control for which a short caption is to be entered (decision 860). If there are more controls remaining, decision 860 branches to "yes" branch 862 whereupon processing loops back to step 805 where the next control is processed. This looping continues until there are no more controls to be processed, at which time decision 860 branches to "no" branch 864 whereupon processing ends at 899.

Figure 9A:
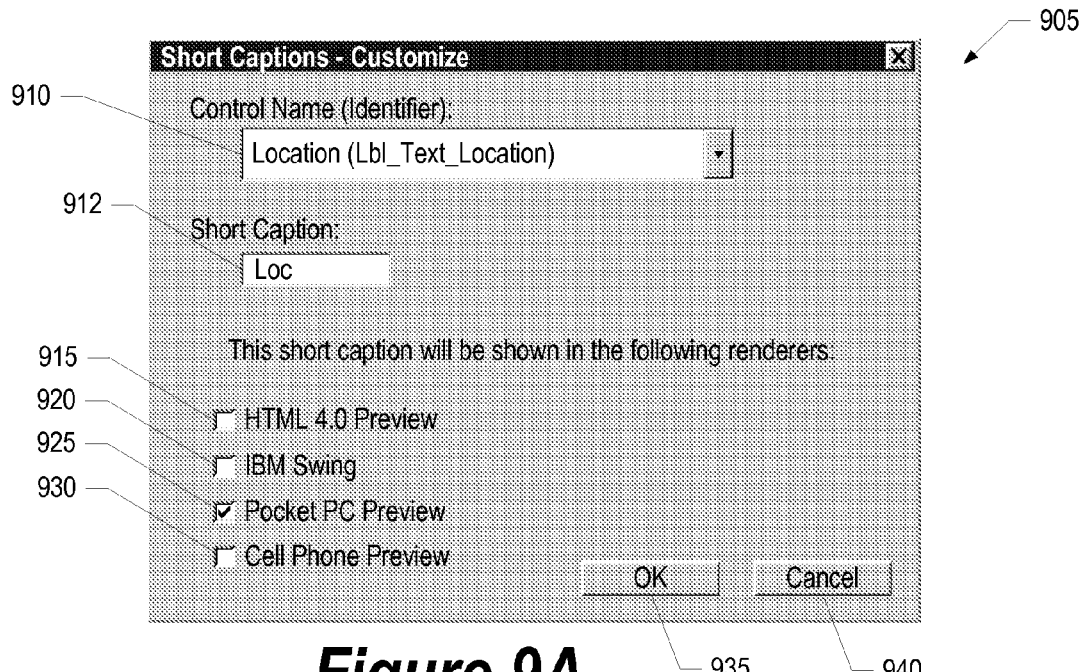
FIG. 9A is an application window illustrating a method for designating an alternative short caption for the a user interface control.

FIG. 9A is an application window illustrating a method for designating an alternative short caption for a control is shown. In the example, the "Location (Lbl_Text_Location)" user interface control is provided with a short caption. As shown, window 905 includes combo box 910 that is used to select a control from a list of all the controls available on the user interface. A user or application designer selects the control for which a caption is to be entered in combo box 910 and proceed to enter the short caption in text box 912. In the example shown, the short caption "Loc" is provided for the "Location" control.

The user selects the renderers in which the short caption is to be displayed. If the user selects check box 915, the short caption is to be displayed the HTML 4.0 preview; if the user selects check box 920, the short caption is to be displayed the IBM Swing; if the user selects check box 925, the short caption is to be displayed the Pocket PC Preview; and if the user selects check box 930, the short caption is to be displayed the Cell Phone Preview. In the example shown, the "Loc" short caption is to be used for the "Location" control in the Pocket PC environment, as noted by the corresponding checkmark.

The user may then click on "OK" button 935 to accept the changes made, or the user may click on "Cancel" button 940 to reject the changes made.

Figure 9B:
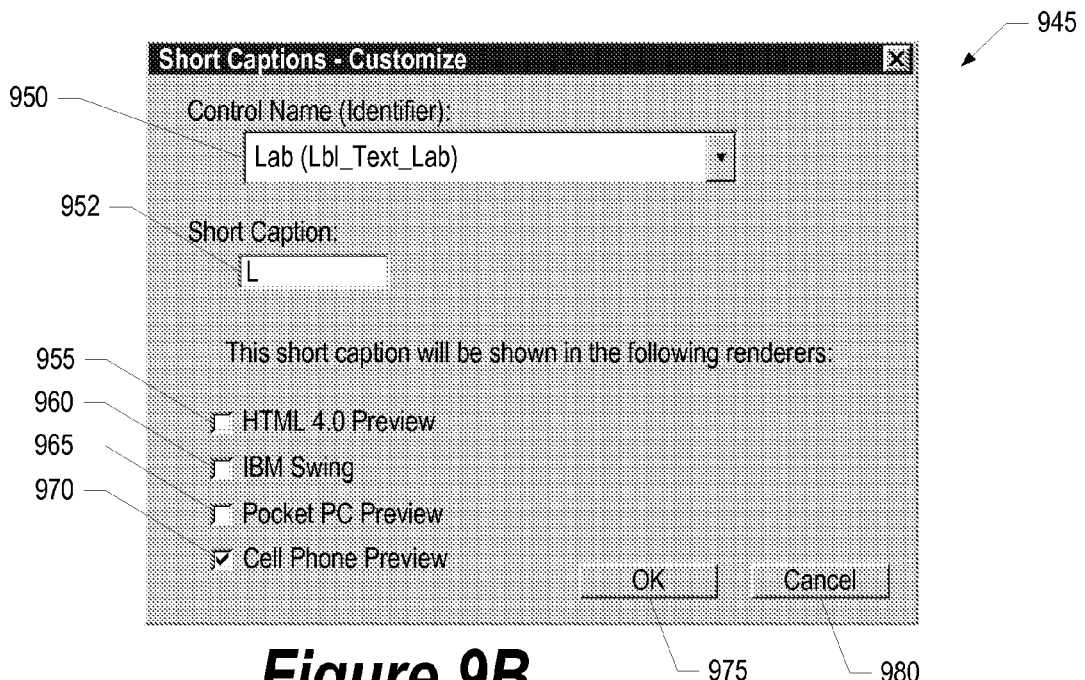
FIG. 9B is an application window illustrating a method for designating an alternative short caption for a user interface control.

FIG. 9B is another application window illustrating a method for designating another short caption. In the example shown, the "Lab (Lbl_Text_Lab)" user interface control is provided with a short caption of "L" in a Cell Phone environment. As shown, window 945 includes combo box 950 that is used to select a control from a list of all the controls available on the user interface. A user or application designer selects the control for which a caption is to be entered in combo box 950 and proceed to enter the short caption in text box 952.

The user selects the renderers in which the short caption is to be displayed. If the user selects check box 955, the short caption is to be displayed in an HTML 4.0 preview; if the user selects check box 960, the short caption is to be displayed in an IBM Swing environment; if the user selects check box 965, the short caption is to be displayed the Pocket PC Preview; and if the user selects check box 970, the short caption is to be displayed the Cell Phone Preview. In the example shown, the short caption "L" is being provided for "Lab" in the Cell Phone environment, as noted by the checkmark.

The user may then click on "OK" button 975 to accept the changes made, or the user may click on "Cancel" button 980 to reject the changes made.

Figure 10:
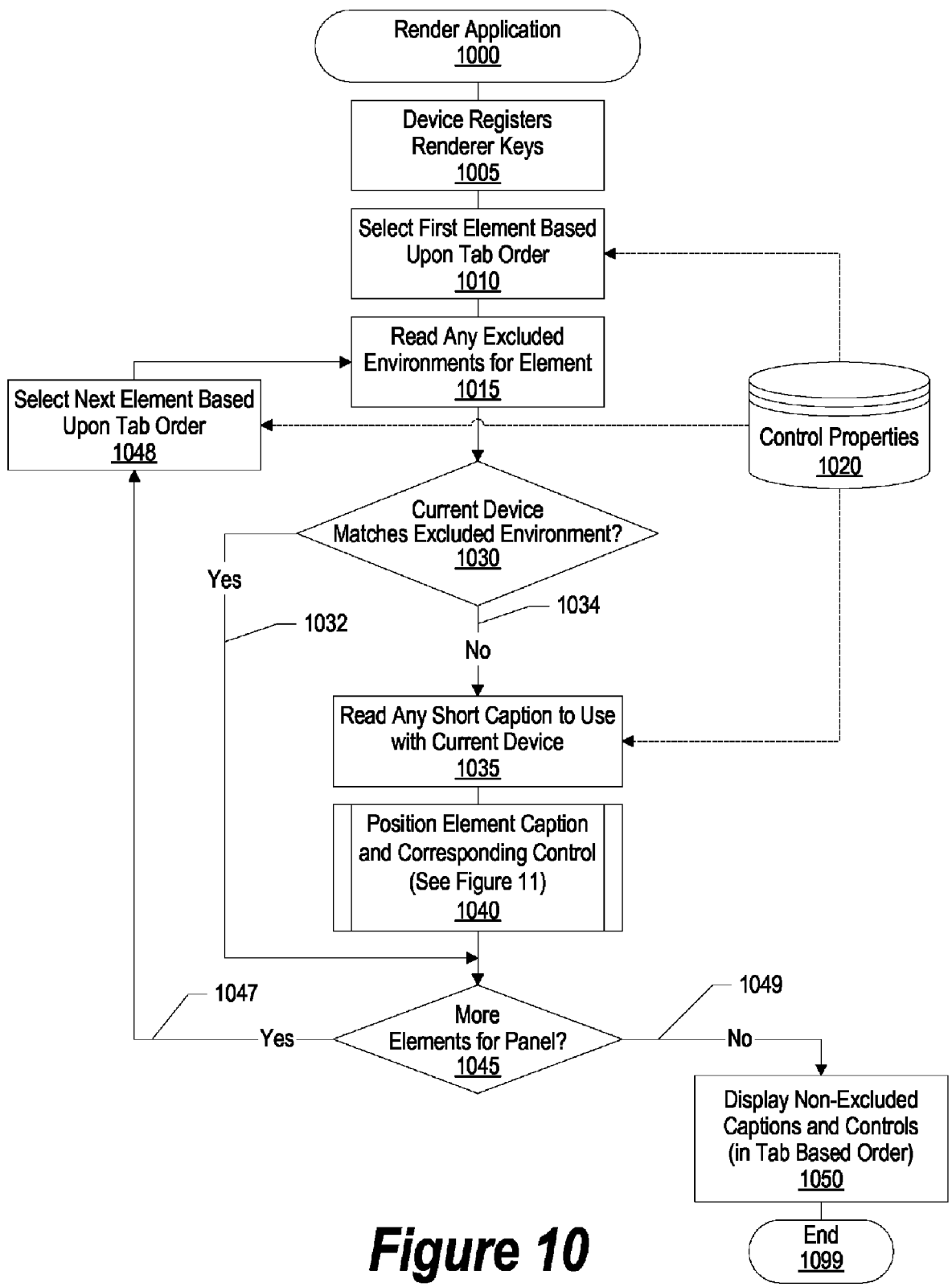
FIG. 10 is a flowchart illustrating a method for rendering an application according to the device on which the application is to be displayed.

FIG. 10 is a flowchart illustrating a method for rendering an application according to the device on which the application is to be displayed. Processing begins at 1000 whereupon, at step 1005, the device registers the device's renderer keys, and at step 1010, the first element to be rendered is selected based upon the tab order of the elements. The tab order is obtained from control properties data store 1020.

At step 1015, any excluded environments (where the element is not to be rendered) are read and identified for the selected element. An element may have one or more environments from which the element is to be excluded. A determination is then made as to whether the device currently used by the user matches one of the excluded environments for the selected element at decision 1030.

If the current device does not match any of the excluded environments, decision 1030 branches to "no" branch 1034 whereupon, at step 1035, a short caption is read, if one exists, from control properties data store 1020 to be displayed with the element on the current device. The element's caption and the corresponding control are positioned on the user's interface (predefined process 1040). More details on the processing that takes place at step 1040 are provided in the flowchart and corresponding text of FIG. 11.

On the other hand, if the device currently used by the user matches an excluded environment, decision 1030 branches to "yes" branch 1032 bypassing step 1035 and predefined process 1040 so that the selected element is not rendered (i.e., is excluded) from the user's display.

A determination is then made as to whether more elements are to be rendered for the window at decision 1045. If there are more elements to be rendered, decision 1045 branches to "yes" branch 1047 whereupon, at step 1048, the next element to be rendered is selected from the control properties data store 1020 in the tab order, and processing loops back to process the newly selected element. This looping continues until there are no more elements to be rendered, at which point decision 1045 branches to "no" branch 1049 whereupon, at step 1050, the non-excluded captions and controls are displayed in the tab order of the captions/controls. Processing thereafter ends at 1099.

Figure 11:
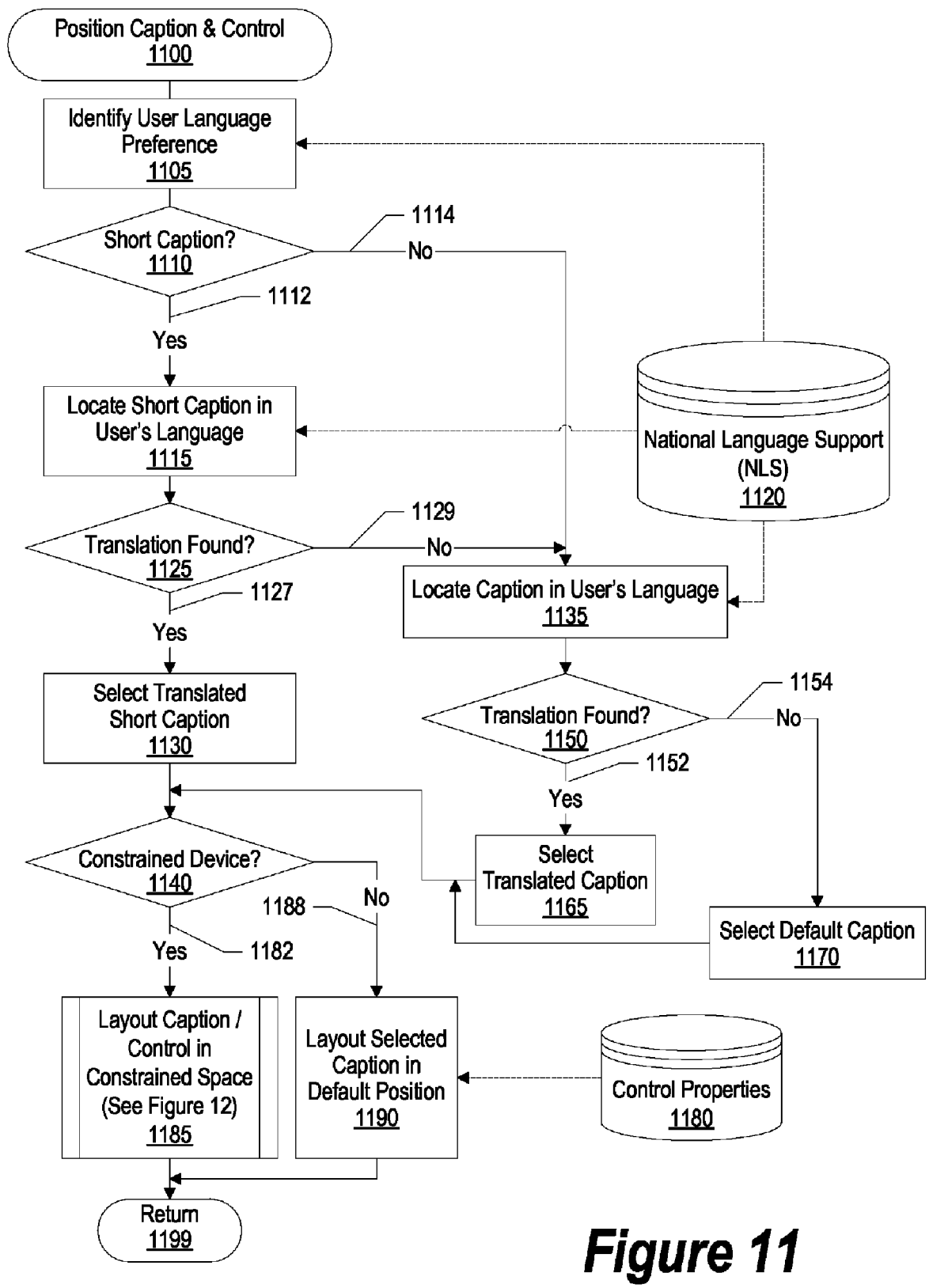
FIG. 11 is a flowchart illustrating a method placing captions on user interface controls depending on the device on which the controls are to be rendered.

FIG. 11 is a flowchart illustrating a method for placing captions on user interface controls depending on the device on which the controls are to be rendered. Processing begins at 1100 whereupon, at step 1105, the user's preferred language is identified.

A determination is made as to whether a short caption is to be used with the selected element at decision 1110. If a short caption is to be used, decision 1110 branches to "yes" branch 1112 whereupon, at step 1115, an attempt is made to locate the short caption in the user's selected language in national language support (NLS) data store 1120. In one embodiment, NLS 1120 is configured to store element captions and short captions in one or more languages in order to provide multilingual support. A determination is then made as to whether a translation for the short caption was found at decision 1125. If the translation was not found, decision 1125 branches to "no" branch 1129 whereupon processing continues at step 1135.

Returning to decision 1110, if a short caption is not to be used, decision 1110 branches to "no" branch 1114 whereupon processing continues at step 1135. At step 1135, the element's full caption is located in the user's language in NLS database 1120. A determination is then made as to whether a translation was found for the full caption at decision 1150. If a translation for the caption was found, decision 1150 branches to "yes" branch 1152 whereupon the translated caption is selected as the caption for the selected element at step 1165. On the other hand, if a translation was not found, decision 1150 branches to "no" branch 1154 whereupon a default (e.g., English) caption is selected. Processing subsequently continues at decision 1140.

Returning to decision 1125, If a translation for the short caption was found, decision 1125 branches to "yes" branch 1127 whereupon, at step 1130, the translated short caption is selected as the caption for the selected element.

At decision 1140, a determination is made as to whether this is a device with a constrained display. If this is a constrained device, decision 1140 branches to "yes" branch 1182 whereupon, the captions and controls are laid out in the constrained environment (predefined process 1185, see FIG. 12 and corresponding text for processing details). On the other hand, if this is not a constrained device, decision 1140 branches to "no" branch 1188 whereupon, at step 1190 the captions and controls are laid out in default positions. In one embodiment, the default position may be obtained from control properties data store 1180. Processing subsequently returns to the calling routine at 1199.

Figure 12:
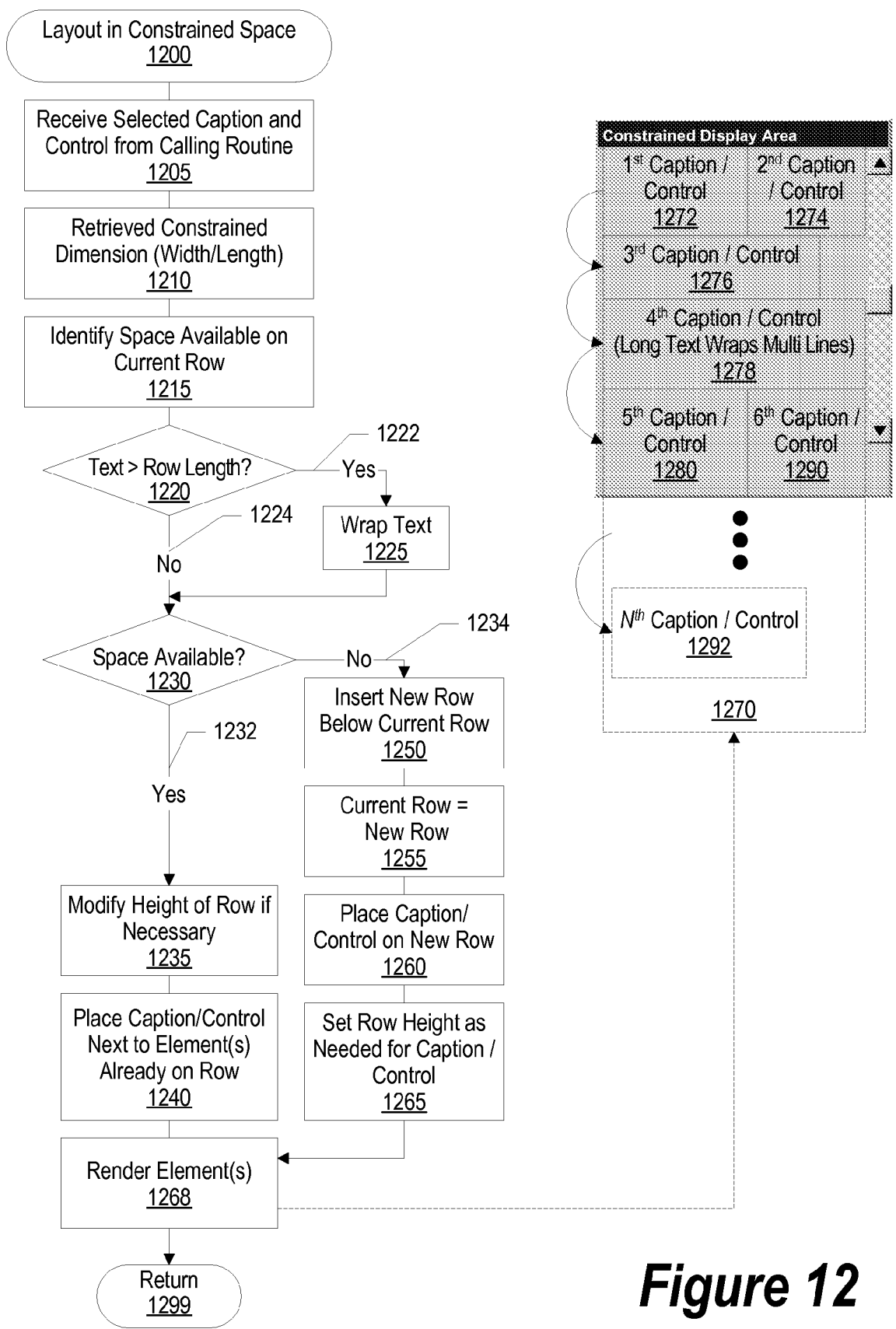
FIG. 12 is a flowchart illustrating a method for determining the layout of user interface controls in a constrained device space.

FIG. 12 is a flowchart illustrating a method for determining the layout of user interface controls in a constrained device space. Processing begins at 1200 whereupon, at step 1205, the selected caption and control are received from the calling routine.

At step 1210, the constrained dimensions (width and height) of the display of the device are received, and at step 1215, the space available on the current rendering row is identified. In one embodiment, elements are rendered in a row until there is no more space available on the current row.

A determination is then made as to whether the length of the caption is greater than the length of the row at decision 1220. If the text length is greater than the length of the row, decision 1220 branches to "yes" branch 1222 whereupon, at step 1225, the text is wrapped to the next row. On the other hand, if the text length is less than the row length, decision 1220 branches to "no" branch 1224 bypassing step 1225.

At decision 1230, a determination is made as to whether the current row has enough available space to display the selected control. If there is not enough available space, decision 1230 branches to "no" branch 1234 whereupon, at step 1250, a new row is inserted below the current row. At step 1255, the current row now becomes the new row, and at step 1260, the caption and/or control are placed in the new row. At step 1265, the row height is set as needed to fit the caption/control. Processing subsequently continues at step 1268.

If space is available on the current row, decision 1230 branches to "yes" branch 1232 whereupon, at step 1235, the height of the row is modified as needed to fit the caption/control. At step 1240, the caption and/or control is placed next to the element already rendered, and at step 1268, the elements are rendered. Processing subsequently returns to the calling routine at return 1299.

Window 1270 shows an example of how elements might be rendered on a constrained display area. Caption/control 1272 and caption/control 1274 are both placed in the first row. Caption/control 1276 cannot fit in the first and is thus placed in the second row.

Similarly, caption/control 1278 is placed in the third row. Caption/control 1280 and caption/control 1290 can fit in one row and are thus placed next to each other in the fourth row. The placement process continues until all the captions/controls have been placed including $N^{th}$ caption/control 1292.

Figure 13:
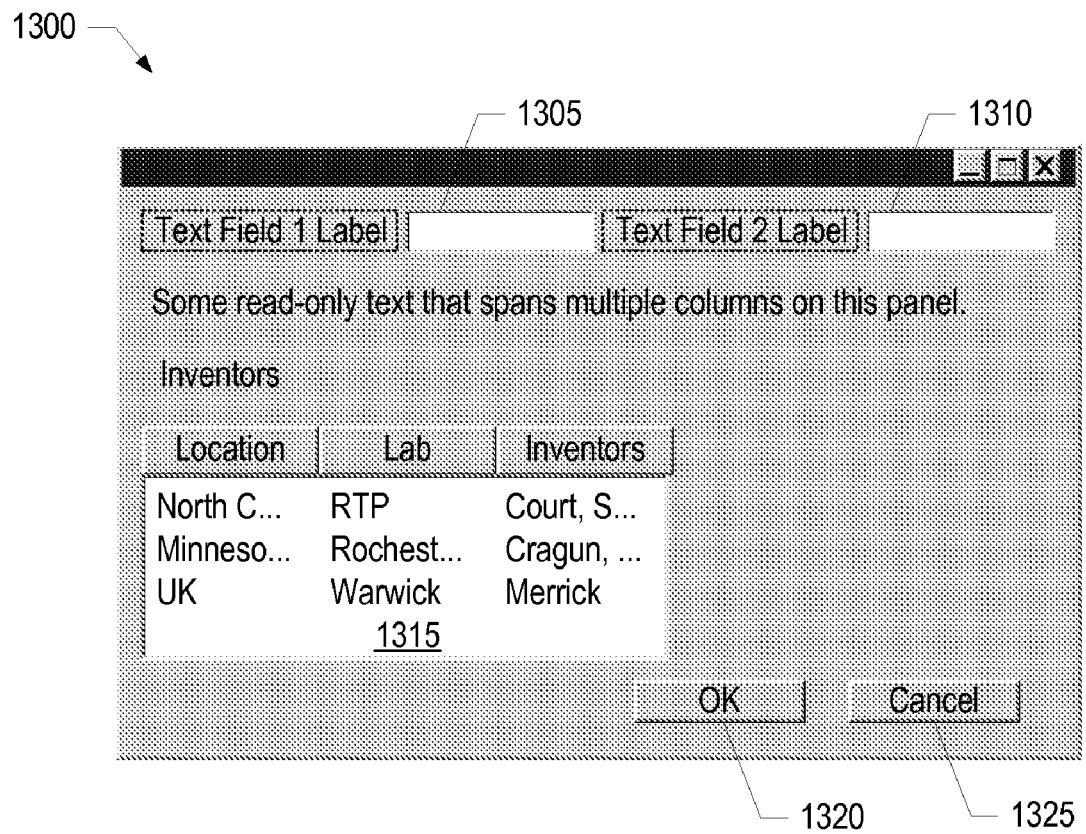
FIG. 13 is an application window illustrating the layout of user interface controls on a device without constrained space.

FIG. 13 is an application window showing the layout of user interface controls on a device without constrained display space. Window 1300 contains text field element 1305 and text field element 1310, which are placed next to each other. The table containing all of the inventors' names is placed under the two text fields. The table is rendered with all columns present as well as full captions for all the columns. Since this is not a constrained device, there is no need, for example, to vertically stack the two text fields, use short captions, or exclude any elements. The user uses the window and clicks on "OK" button 1320 to accept and save the changes or clicks on "Cancel" button 1325 to reject any changes that were made.

Figure 14:
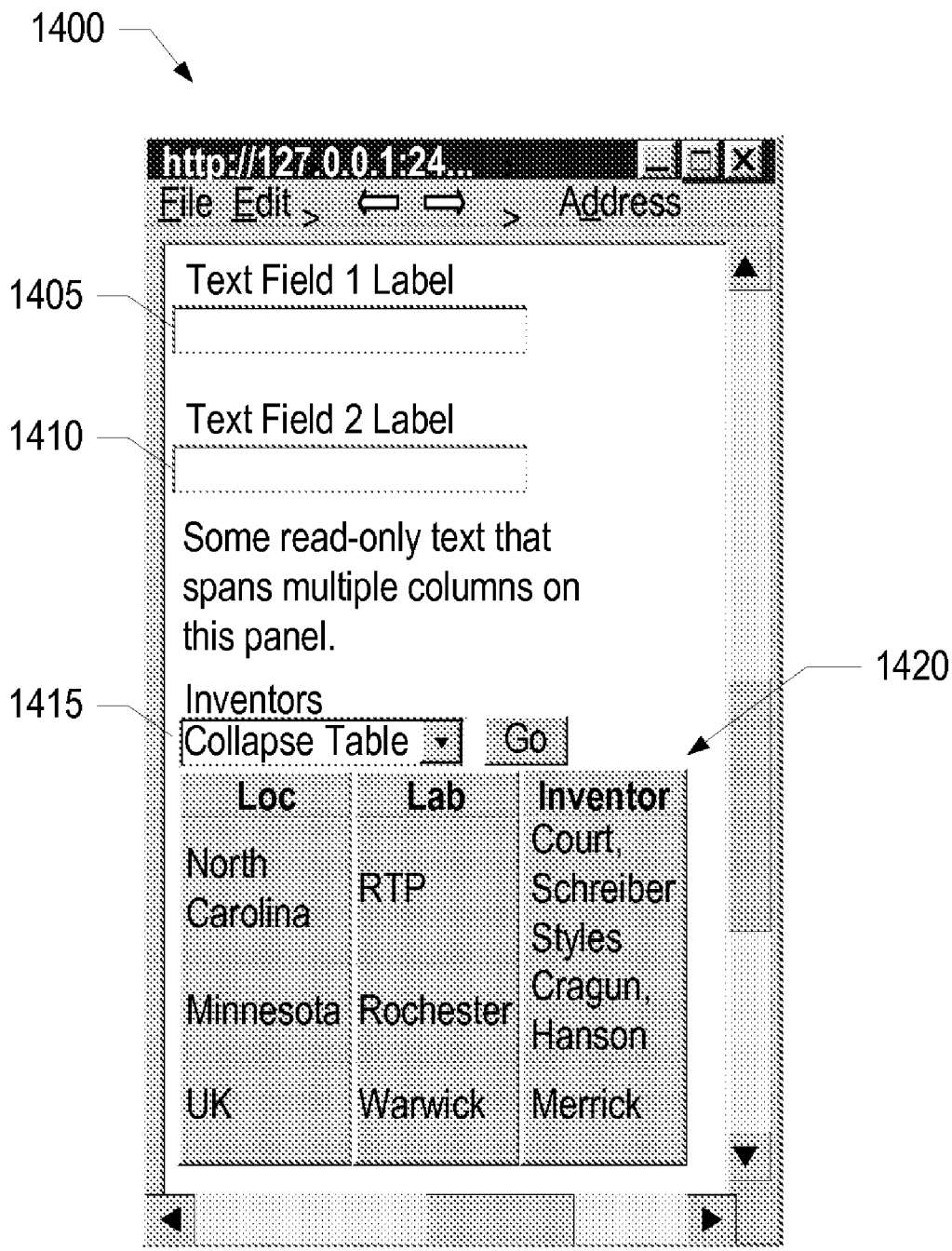
FIG. 14 is an application window illustrating the layout of user interface controls on a device without constrained space.

FIG. 14 is an application window showing the layout of user interface controls on a device with constrained space. Window 1400 contains text field element 1405 and text field element 1410. In this case, there is not enough room to render the two fields side-by-side, and thus, the two text field elements are rendered vertically one above the other (in tab order). In addition, table 1420 is shown here rendered with the short caption for the first (location) column (i.e., short caption "Loc" appears). In addition, window 1400 contains selection box 1415 where a user can choose not to display table 1420 if the user does not wish to see the table, thus saving additional display space in cases where display space is critical.

Figure 15:
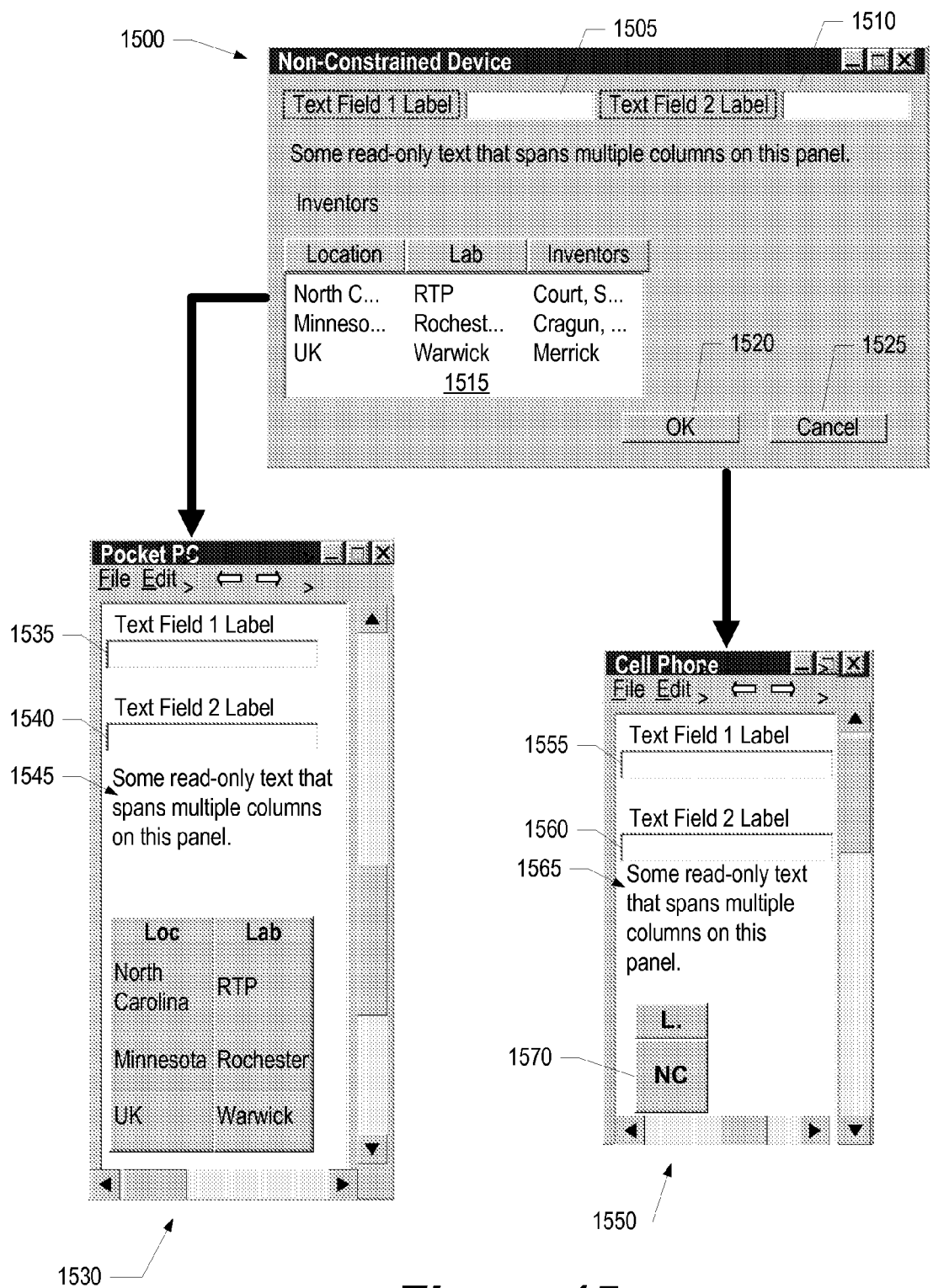
FIG. 15 shows application windows illustrating how the same user interface controls can be layout on devices having different space constraints.

FIG. 15 shows application windows illustrating how the same user interface controls can be layout on devices having different display space constraints. Window 1500 is shown as the window would be displayed on a non-constrained device. Window 1500 contains text field 1505 and text field 1510, which is placed horizontally next to text field 1505. In addition, non-constrained window contains table 1515 having the location, the lab, and the name of each inventor. All the columns in the table are shown and full captions are used to label all the elements. If any changes are made, the user clicks "OK" button 1520 to accept and save the changes or clicks on "Cancel" button 1525 to reject any changes made.

Window 1530 shows the same window that was created and displayed in Pocket PC window 1530. Since there is not enough room in the first row, text field 1535 and text field 1540 are rendered on two separate rows. In addition, read-only text 1545 is wrapped so that it is displayed without the user needing to horizontally scroll to view all of the text. Furthermore, the "Inventors" column in the table has been designated as "excluded" from a Pocket PC environment, and thus, this column does not appear in the window. In addition, a short caption has been designated to be used for the Location column ("Loc" displayed instead of "Location") in order to save additional rendering space for the table.

Window 1550 shows the same window that was created and displayed in Cell Phone window 1530. Since there is not enough room in the first row, text field 1555 and text field 1560 are rendered on two separate rows. In addition, read-only text 1565 is wrapped so that it is displayed without the user needing to horizontally scroll to view all of the text. Furthermore, the "Location" column and the "Inventors" column have been designated as "excluded" from a Cell Phone environment, and thus, these columns do not appear in the window. In addition, a short caption has been designated to be used for the Lab column ("L" displayed instead of "Lab") in order to save additional rendering space for the table. Finally, short caption 1570 has been provided to abbreviate state names, so that the abbreviation "NC" appears instead of "North Carolina."

Figure 16:
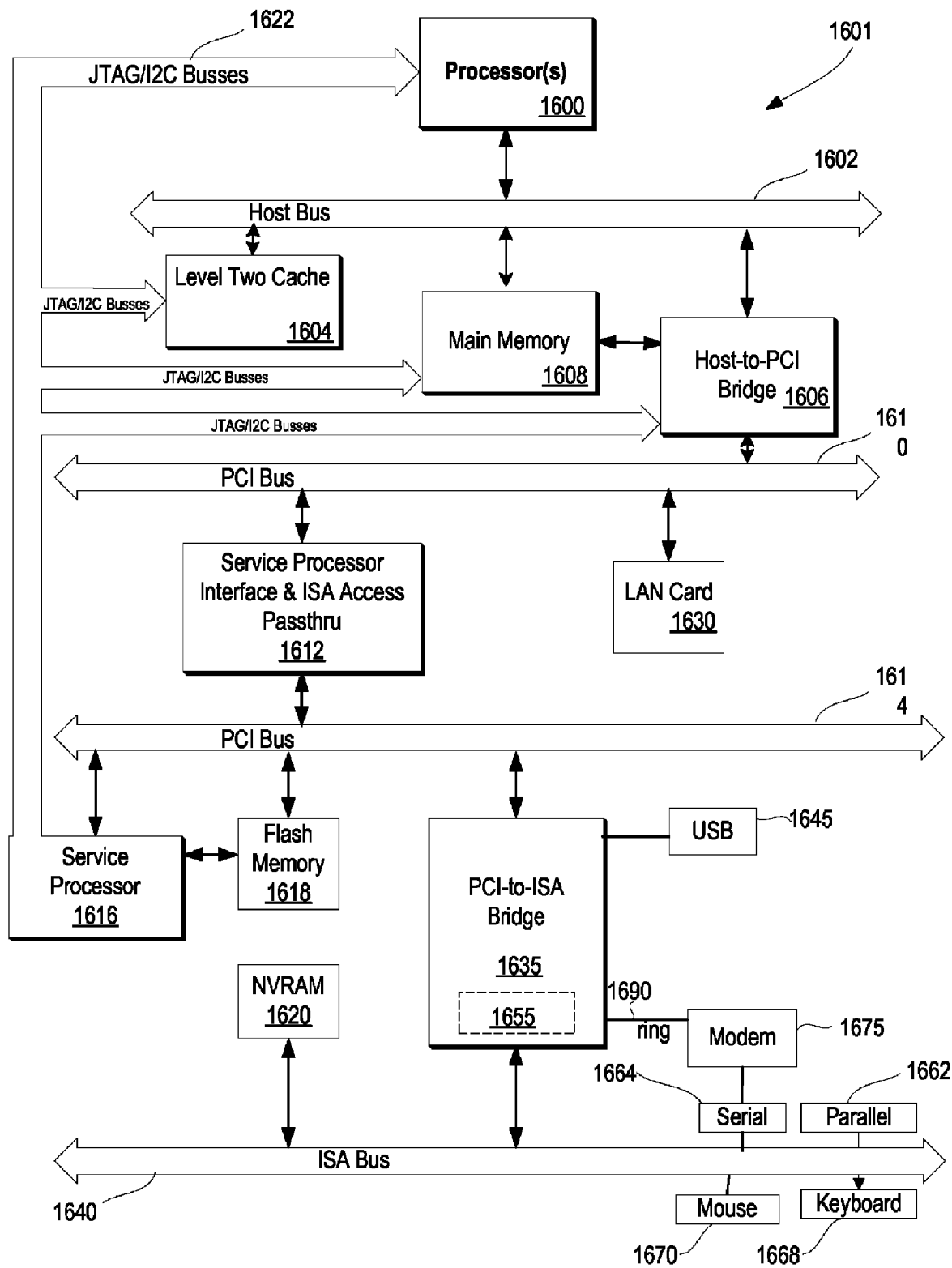
FIG. 16 is a block diagram of an information handling system capable of implementing the present invention.

FIG. 16 illustrates information handling system 1601 which is a simplified example of a computer system capable of performing the computing operations described herein. Computer system 1601 includes processor 1600 which is coupled to host bus 1602. A level two (L2) cache memory 1604 is also coupled to host bus 1602. Host-to-PCI bridge 1606 is coupled to main memory 1608, includes cache memory and main memory control functions, and provides bus control to handle transfers among PCI bus 1610, processor 1600, L2 cache 1604, main memory 1608, and host bus 1602. Main memory 1608 is coupled to Host-to-PCI bridge 1606 as well as host bus 1602. Devices used solely by host processor(s) 1600, such as LAN card 1630, are coupled to PCI bus 1610. Service Processor Interface and ISA Access Pass-through 1612 provides an interface between PCI bus 1610 and PCI bus 1614. In this manner, PCI bus 1614 is insulated from PCI bus 1610. Devices, such as flash memory 1618, are coupled to PCI bus 1614. In one implementation, flash memory 1618 includes BIOS code that incorporates the necessary processor executable code for a variety of low-level system functions and system boot functions.

PCI bus 1614 provides an interface for a variety of devices that are shared by host processor(s) 1600 and Service Processor 1616 including, for example, flash memory 1618. PCI-to-ISA bridge 1635 provides bus control to handle transfers between PCI bus 1614 and ISA bus 1640, universal serial bus (USB) functionality 1645, power management functionality 1655, and can include other functional elements not shown, such as a real-time clock (RTC), DMA control, interrupt support, and system management bus support. Nonvolatile RAM 1620 is attached to ISA Bus 1640. PCI-to-SCSI bridge 1680 provides bus control to handle transfers between PCI bus 1614 and SCSI bus 1685. SCSI device 1690 (i.e. a SCSI hard drive) communicates with other parts of computer system 1601 using SCSI bus 1685.

Service Processor 1616 includes JTAG and I2C busses 1622 for communication with processor(s) 1600 during initialization steps. JTAG/I2C busses 1622 are also coupled to L2 cache 1604, Host-to-PCI bridge 1606, and main memory 1608 providing a communications path between the processor, the Service Processor, the L2 cache, the Host-to-PCI bridge, and the main memory. Service Processor 1616 also has access to system power resources for powering down information handling device 1601.

Peripheral devices and input/output (I/O) devices can be attached to various interfaces (e.g., parallel interface 1662, serial interface 1664, keyboard interface 1668, and mouse interface 1670 coupled to ISA bus 1640. Alternatively, many I/O devices can be accommodated by a super I/O controller (not shown) attached to ISA bus 1640.

In order to attach computer system 1601 to another computer system to copy files over a network, LAN card 1630 is coupled to PCI bus 1610. Similarly, to connect computer system 1601 to an ISP to connect to the Internet using a telephone line connection, modem 1675 is connected to serial port 1664 and PCI-to-ISA Bridge 1635.

While the computer system described in FIG. 16 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
    one or more processors;
    a memory coupled to the processors;
    a nonvolatile storage device;
    a display device accessible from the processors;
    retrieval logic for retrieving a plurality of element properties corresponding to a plurality of elements, wherein the elements are adapted to be displayed on the display device, and wherein the element properties for each element includes a unique tab order number;
    determination logic for determining that the display device is a constrained display device;
    arrangement logic for positioning the selected elements in a display buffer in order of the element's tab order number, so that elements with lower tab order numbers are positioned towards the top of a display and elements with higher tab order numbers are positioned towards the bottom of the display, wherein the arrangement logic further includes:

logic for positioning fewer elements in a horizontal orientation to one another than if the display device was not a constrained display device; and logic for positioning more elements in a vertical orientation to one another than if the display device was not a constrained display device;

display logic for rendering the display buffer on the display device; and alteration logic for altering the tab order numbers included in the element properties prior to the retrieving, positioning, and rendering steps, wherein the alteration logic further includes:

retrieval logic for retrieving an initial unique tab order number for each of the elements;

display logic for displaying, on a tab order display panel, the initial unique tab order numbers in a location proximate to the elements that correspond to the initial unique tab order numbers; and sequencing logic for swapping the initial unique tab order numbers corresponding to two of the elements, the swapping resulting in the tab order numbers that correspond to the two elements.

2. The information handling system of claim 1 wherein the tab order number indicates a sequence that a cursor moves from one element to another when a tab key is pressed by a user.

3. The information handling system of claim 1 further comprising:

reception logic for receiving a selection from a user of the tab order display panel, the selection corresponding to one of the initial unique tab order numbers, wherein the reception logic further includes:

logic for detecting that the initial unique tab order number corresponding to a first element selected from the plurality of elements has been selected and dragged to a position proximate to a second element selected from the plurality of elements, wherein the first and second elements are the two elements whose corresponding initial unique tab order numbers are swapped.

4. The information handling system of claim 1 further comprising:

storage logic for saving the altered tab order numbers that correspond to the two elements in the element properties that correspond to the two elements.

5. A non-transitory computer storage medium, the non-transitory computer storage medium containing instructions for execution by a computer, which, when executed by the computer, cause the computer to implement a method comprising:

retrieving a plurality of element properties corresponding to a plurality of elements, wherein the elements are adapted to be displayed on a display device, and wherein the element properties for each element includes a unique tab order number;

determining that the display device is a constrained display device;

positioning the selected elements in a display buffer in order of the element's tab order number, so that elements with lower tab order numbers are positioned towards the top of a display and elements with higher tab order numbers are positioned towards the bottom of the display, wherein the positioning further includes:

positioning fewer elements in a horizontal orientation to one another than if the display device was not a constrained display device; and positioning more elements in a vertical orientation to one another than if the display device was not a constrained display device;

rendering the display buffer on the display device; and altering the tab order numbers included in the element properties prior to the retrieving, positioning, and rendering steps, wherein the altering further comprises:

retrieving an initial unique tab order number for each of the elements;

displaying, on a tab order display panel, the initial unique tab order numbers in a location proximate to the elements that correspond to the initial unique tab order numbers; and swapping the initial unique tab order numbers corresponding to two of the elements, the swapping resulting in the tab order numbers that correspond to the two elements.

6. The non-transitory computer storage medium of claim 5 wherein the tab order number indicates a sequence that a cursor moves from one element to another when a tab key is pressed by a user.

7. The non-transitory computer storage medium of claim 5 wherein the method further comprises:

receiving a selection from a user of the tab order display panel, the selection corresponding to one of the initial unique tab order numbers, wherein the receiving further includes:

detecting that the initial unique tab order number corresponding to a first element selected from the plurality of elements has been selected and dragged to a position proximate to a second element selected from the plurality of elements, wherein the first and second elements are the two elements whose corresponding initial unique tab order numbers are swapped.

8. The non-transitory computer storage medium of claim 5 wherein the method further comprises:

saving the altered tab order numbers that correspond to the two elements in the element properties that correspond to the two elements.

9. An information handling system comprising:

one or more processors;

a memory coupled to the processors;

a nonvolatile storage device;

a display device accessible from the processors;

means for retrieving a plurality of element properties corresponding to a plurality of elements, wherein the elements are adapted to be displayed on the display device, and wherein the element properties for each element includes a unique tab order number;

means for determining that the display device is a constrained display device;

means for positioning the selected elements in a display buffer in order of the element's tab order number, so that elements with lower tab order numbers are positioned towards the top of a display and elements with higher tab order numbers are positioned towards the bottom of the display, wherein the means for positioning further comprises:

means for positioning fewer elements in a horizontal orientation to one another than if the display device was not a constrained display device; and means for positioning more elements in a vertical orientation to one another than if the display device was not a constrained display device;

means for rendering the display buffer on the display device; and means for altering the tab order numbers included in the element properties prior to the retrieving, positioning, and rendering, wherein the means for altering further comprises:
  means for retrieving an initial unique tab order number for each of the elements;
  means for displaying, on a tab order display panel, the initial unique tab order numbers in a location proximate to the elements that correspond to the initial unique tab order numbers; and
  means for swapping the initial unique tab order numbers corresponding to two of the elements, the swapping resulting in the tab order numbers that correspond to the two elements.

* * * * *